Dec. 6, 1966  R. C. LOCKE  3,290,560
ELECTRICAL WIRING SYSTEM
Filed Nov. 17, 1961
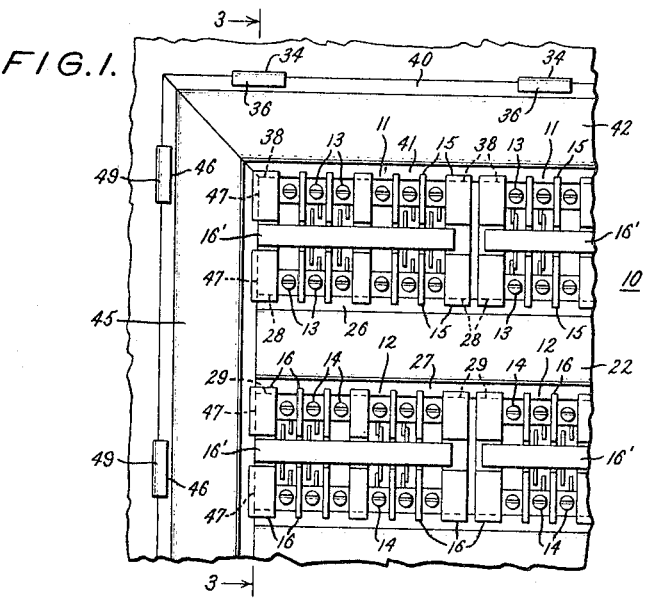
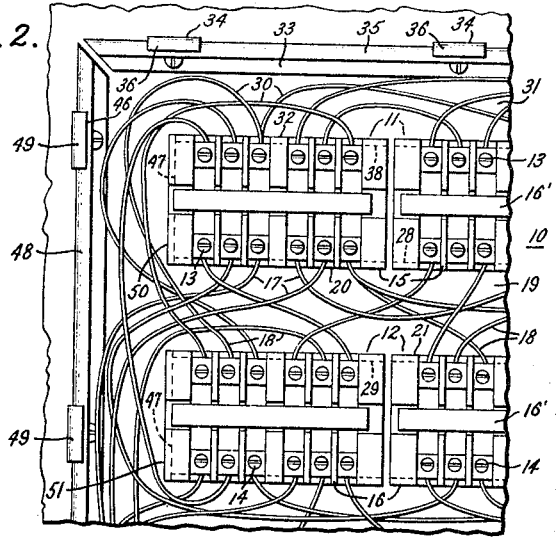
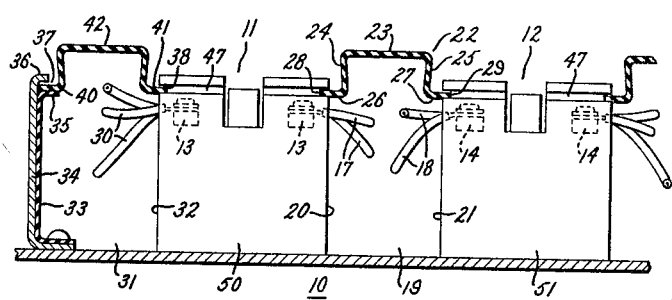
INVENTOR:
RAYMOND C. LOCKE,
BY David M. Schiller
ATTORNEY.

ns patent
Dec. 6, 1966

3,290,560
ELECTRICAL WIRING SYSTEM
Raymond C. Locke, Bloomington, Ill., assignor to General Electric Company, a corporation of New York
Filed Nov. 17, 1961, Ser. No. 153,059
8 Claims. (Cl. 317—122)

This invention relates to electrical wiring systems and particularly to a trough arrangement for containing conductors leading to and from devices mounted on a panelboard.

In panelboard constructions a number of electrical devices, such as relays etc., are mounted in spaced relation on the panelboard with conductors leading to and from the devices to provide electrical connections therebetween. Various arrangements have heretofore been proposed for containing the conductors so as to improve the appearance of the panelboard and to conserve space thereon. Previous wiring trough proposals have not been entirely satisfactory in that they either have been too expensive, take up valuable space on the panelboard, or have added to the already time consuming operation of connecting and disconnecting the wires to and from the electrical devices.

In one well-known trough arrangement an elongated channel-shaped member is secured to the panelboard in the space between two confronting rows of electrical devices. The flanges of the member contain longitudinally spaced slots through which the conductors leading to and from the devices extend. A cover is detachably connected to the flanges to enclose the conductors located within the channel. The trough arrangement above described requires considerable space between the trough and the devices to permit insertion and withdrawal of conductors into and out of the slots formed in the channel flanges. In addition, the trough is of multi-part construction including the channel, the cover and fastening means for securing the channel to the panelboard. Further, the device is relatively expensive due to the multi-part construction and also due to the necessity of forming slots in the flanges of the channel.

It is therefore a primary object of the present invention to provide a novel and improved wiring arrangement including a wiring trough which is of inexpensive construction and which incorporates a minimum number of parts.

It is another object of the invention to provide a novel and improved wiring trough which requires a minimum amount of space between electrical devices on a panelboard and which minimizes the wiring effort required to connect and disconnect conductors to and from the devices.

It is a further object of the invention to provide a wiring trough for conductors leading to and from spaced electrical devices which is formed in part by the walls of the electrical devices.

In carrying out the invention in one preferred form a wiring arrangement is provided for containing conductors leading to and from electrical devices mounted in spaced rows on a panelboard. The electrical devices in each row are formed with slots aligned with and facing slots formed in the devices of the adjacent row. An elongated part having spaced parallel edges forms the cover of the trough and is configured so that the edges thereof fit within the aligned slots formed in the devices of adjacent rows. The elongated part preferably is formed of resilient material so that the edges thereof can be snapped into the device slots to permit quick installation and removal thereof. With such arrangement the walls of the devices in adjacent rows form the sides of the trough, and conductors leading to and from the devices are positioned in the space between the two rows beneath the elongated part.

Other objects and advantages of the invention will become apparent from the following description taken in conjunction with the accompanying drawings, in which:

FIG. 1 is a view in top plan with parts broken away of a panelboard mounting a plurality of electrical devices and showing a plurality of trough covers in operative position;

FIG. 2 is a view similar to FIG. 1 but with the trough covers removed; and

FIG. 3 is a sectional view taken along the line 3—3 of FIG. 1.

Referring now to the drawings there is illustrated in FIG. 1 a panelboard represented generally by the numeral 10 mounting a plurality of electrical devices 11 and 12 which may assume various forms such as multicontact electrical relays. The relays 11 are arranged in a horizontal row as viewed in FIG. 1 which is spaced from and parallel to the horizontal row defined by the devices 12. Each of the devices 11 includes a plurality of electro-conductive terminals 13 and in a similar manner each of the devices 12 includes a plurality of electro-conductive terminals 14, confronting the terminals 13, the terminals 13 being spaced by insulating barriers 15 and the terminals 14 being spaced by insulating barriers 16. Each of the relays 11 and 12 includes fixed contacts attached to the terminals 13 and 14 and movable contacts on carriers 16' which provide with the fixed contacts various combinations of normally open and normally closed contact conditions.

In order to electrically connect the relays 11 and 12 a plurality of electrical conductors are connected to selected ones of the terminals 13 and 14 and as shown in FIGS. 2 and 3, conductors 17 are connected to the terminals 13 of the relays 11 and conductors 18 are connected to the terminals 14 of the relays 12. The conductors 17 and 18 extend into and pass through the space between the relays 11 and 12 and are contained within a trough 19 between the two rows of relays, the sides of the trough 19 being formed by the confronting walls 20 and 21 of the relays 11 and 12 respectively as best shown in FIG. 3.

The trough 19 is closed at its top by means of an elongated top or cover member 22 shown as having a base or top wall 23 with spaced, inwardly inclined side walls 24 and 25 depending therefrom and including laterally outwardly extending generally coplanar flanges 26 and 27 having longitudinally extending edges. The top member 22 is positioned with respect to the two rows of relays 11 and 12 such that the flange 26 fits within a plurality of aligned slots 28 formed in the barriers 15 of the relays 11, and with the flange 27 within a plurality of aligned slots 29 formed in the barriers 16 of the relays 12. The top member 22 is preferably formed of a resilient insulating material of such configuration as to be capable of snap-in engagement with the slots 28 and 29. To install the member 22 it is only necessary to compress the walls 24 and 25 toward each other so as to permit entry of the flanges 26 and 27 into the slots 28 and 29 when the walls 24 and 25 are released.

In order to accommodate conductors 30 leading to and from the left-hand terminals 13 of the relays 11 as viewed in FIG. 3, a trough 31 is provided and includes sides defined by the left-hand walls 32 of the relays 11 and by a supporting structure including an elongated channel-shaped member 33 extending the full length of the row of relays 11, and a plurality of spaced channel-shaped members 34 adjacent the member 33 and secured therewith to the panelboard 10 in any suitable manner. The member 33 includes an upper inturned lip or flange 35 which defines with a plurality of upper inturned lips or flanges 36 of the members 34 to form a plurality of slots 37 horizontally aligned with each other and with the slots 38 formed in the left-hand barriers 15 of the relays 11 as viewed in FIG. 3. The slots 37 and 38 are configured to receive respectively outwardly extending flanges 40 and 41 of a top member 42 similar in configuration to the top member 22 previously described.

An arrangement similar to that just described may be employed for accommodating conductors leading to and from the relays 11 and 12 and which extend vertically as viewed in FIG. 1 as the left-hand ends of the rows of relays 11 and 12. To this end a trough top member 45, similar to the tops 22 and 42 previously described, may be snapped into aligned grooves or slots 46 and 47 formed respectively in support members 48 and 49 similar to the members 33 and 34, and in the end faces 50 and 51 of the end ones of the members 11 and 12. As viewed in FIG. 1 it is seen that the end surfaces of the top members 42 and 45 are angularly disposed so as to be in abutting relation to form a neat appearing joint.

It is thus seen that the invention provides a very neat appearing panelboard wherein a multitude of conductors leading to and from a number of relays or other electrical devices on the panelboard are completely hidden from view. In addition, the conductors are readily exposed by the simple expedient of removing a top cover member which fits within grooves formed in sides of the relays and in support members spaced from the relays. The top covers may be readily removed by simply compressing the side walls thereof towards each other to clear the flanges from the retaining slots. The wiring troughs actually are of one piece construction consisting of the top portion thereof inasmuch as the sides of the relays themselves form the walls of the troughs. It is not necessary to thread conductors into and out of spaced slots formed in side walls of a channel-shaped member as heretofore employed. As a consequence, the time and effort involved in connecting conductors to the terminals of the relays is materially reduced by means of the invention.

While I have shown but a single embodiment of my invention, it should be understood that this is clearly illustrative in nature and has been set forth as a preferred form of the invention. Since certain variations in the invention will doubtless occur to those skilled in the art to which it pertains, I intend to cover by the appended claims all such variations as fall within the true spirit and scope of this invention.

What I claim as new and desire to secure by Letters Patent of the United States is:

1. In an electrical system, an electrical device having a first side wall, means spaced from said device and having a second side wall confronting said first wall, conductors connected to said device and extending into the space between said first and second walls, said first and second walls having confronting longitudinally extending slots, and a cover member having longitudinally extending edges adapted to be positioned in detachable interfitting engagement with said slots to enclose said conductors, said cover member and said first and second walls when engaged forming a trough containing said conductors.

2. In an electrical system, an electrical device having a first side wall, insulating barriers spaced longitudinally along said first wall, electroconductive terminals in the spaces between adjacent ones of said barriers, means spaced from said device and having a second wall confronting said first wall, said second wall having a longitudinally extending slot, said barriers each having a slot with said barrier slots in longitudinal alignment and confronting the slot of said second wall, conductors connected to said terminals and extending into the space between said first and second walls, and a cover member having longitudinally extending edges adapted to be positioned in detachable interfitting engagement with said barrier slots and the slot of said second wall to enclose said conductors, said cover member and said first and second walls when engaged forming a trough containing said conductors.

3. In an electrical system, a pair of spaced electrical devices having spaced confronting side walls, conductors connected to said devices and extending into the space between said walls, said walls having confronting longitudinally extending slots, and a resilient insulating cover member having longitudinally extending edges adapted to be positioned in detachable snap-in engagement with said slots to enclose said conductors, said cover member and said walls when engaged forming a trough containing said conductors said cover member being detachable from said walls by deformation of said cover member to disengage the edges thereof from said slots.

4. In an electrical system, a pair of spaced electrical devices having spaced confronting side walls, conductors connected to said devices and extending into the space between said walls, said walls having confronting longitudinally extending slots, and a resilient insulating cover member having outwardly extending flanges connected to a top wall by spaced side walls, said cover member being adapted to be positioned with said flanges in detachable engagement with said slots to enclose said conductors, said cover member and said device side walls when engaged forming a trough containing said conductors, said cover member being detachable from said device side walls by compression of its side walls towards each other to clear the flanges from said slots.

5. In an electrical system, a pair of spaced electrical devices having spaced confronting side walls, insulating barriers spaced longitudinally along each of said walls, electroconductive terminals in the spaces between adjacent ones of said barriers, conductors connected to said terminals and extending into the space between said walls, each barrier having a slot with the slots of barriers of each device in longitudinal alignment, and a resilient insulating cover member having longitudinally extending edges adapted to be positioned in detachable snap-in engagement with said slots to enclose said conductors, said cover member and said walls when engaged forming a trough containing said conductors, said cover member being detachable from said walls by deformation of said cover member to disengage the edges thereof from said slots.

6. In an electrical system, a panel board, a plurality of electrical devices mounted on said panelboard in a pair of generally parallel spaced rows, each of said devices having opposed first and second side walls connected by end walls, the first walls of devices in one row confronting the first walls of devices in the other row, a support wall having a first section extending transversely of said rows and spaced from the end walls of the devices at adjacent ends of said rows, and having a second section extending generally parallel to said rows and spaced from the second walls of the devices of one row, the first and second sections of said support wall having slots longitudinally extending and aligned, the first walls of said devices having longitudinally extending slots longitudinally aligned in each row, the second walls of devices in one row having slots longitudinally extending and aligned, the end walls of said end devices having slots longitudinally extending and aligned, conductors leading to and from said devices and extending beneath all the slots into the spaces between said confronting first walls, between the first section of said support wall and said end walls, and between the second section of said support wall and the second walls of the devices in said one row, and a plurality of cover members each having longitudinally extending edges and positioned so that the edges of one cover member fit within the slots of said confronting first walls, the edges of a second cover member fit within the slot of said first section and the slots of the end walls of said end devices, and the edges of a third cover member fit within the slot of said second section and the slots of the second walls of devices in said one row.

7. In an electrical system, an electrical device having a first side wall, means spaced from said device and having a second side wall confronting said first wall, conductors connected to said device and extending into the space between said first and second walls; and an elongated cover member adapted to be detachably secured to said device and said means to enclose said conductors, said cover member and said device and said means having cooperating slots and edges arranged for detachable interfitting engagement, said cover member when secured to said device and said means overlying said conductors and forming with said first and second walls a covered trough containing said conductors, said interfitting slots and edges extending substantially parallel to the direction of elongation of the cover member and providing the sole means of securement of said cover member, said cover member being detachable from said device and said means solely by disengagement of said slots and edges.

8. In an electrical system, a pair of spaced electrical devices having spaced confronting side walls, conductors connected to said devices and extending into the space between said walls, and a resilient insulating cover member adapted to be detachably secured to said walls to enclose said conductors, said cover member and said walls having parts adapted for detachable interfitting engagement, said cover member and said walls when engaged forming a trough containing said conductors, said cover member having spaced side walls connected by a top wall and being detachable from said device walls by compression of its side walls towards each other to disengage said interfitting parts.

References Cited by the Examiner
UNITED STATES PATENTS

| 2,471,970 | 5/1949 | Miloche. | |
| 2,916,721 | 12/1959 | Adams | 317—118 |
| 3,041,504 | 6/1962 | Lacan | 317—118 |

FOREIGN PATENTS

| 1,158,564 | 6/1958 | France. |
| 1,213,786 | 4/1960 | France. |

ROBERT K. SCHAEFER, *Primary Examiner.*

JOHN F. BURNS, *Examiner.*

R. S. MACON, *Assistant Examiner.*